United States Patent [19]
Chen et al.

[11] Patent Number: 5,930,795
[45] Date of Patent: Jul. 27, 1999

[54] SUPPORTING DYNAMIC TABLES IN SQL QUERY COMPILERS

[75] Inventors: Yao-Ching Stephen Chen, Saratoga; Jyh-Herng Chow, San Jose; Roberta Jo Cochrane, Los Gatos; Gene Y.C. Fuh, San Jose; Nelson Mendonca Mattos, San Jose; Mir Hamid Pirahesh, San Jose; Jeffrey D. Richey, Santa Clara; Brian Thinh-Vinh Tran; Tuong Chanh Truong, both of San Jose, all of Calif.

[73] Assignee: International Business Machines Corporation, Armonk, N.Y.

[21] Appl. No.: 08/786,603

[22] Filed: Jan. 21, 1997

[51] Int. Cl.$^6$ ........................................ G06F 17/30
[52] U.S. Cl. .................... 707/100; 395/101; 395/104; 395/105; 395/710
[58] Field of Search ..................... 395/705, 704, 395/185.01, 710, 701; 707/100

[56] References Cited

U.S. PATENT DOCUMENTS

| | | | |
|---|---|---|---|
| 5,093,916 | 3/1992 | Karp et al. | 395/700 |
| 5,613,120 | 3/1997 | Palay et al. | 395/710 |
| 5,615,400 | 3/1997 | Cowsar et al. | 395/685 |
| 5,680,619 | 10/1997 | Gudmundson et al. | 395/701 |

OTHER PUBLICATIONS

Martin C. Sturzenbecker, "Building an Object–Oriented Environment for distributed Manufacturing Software", IEEE, pp. 1972–1978, Jan. 1991.

ISO–ANSI working Draft, "Information Technology—Database Language SQL", Jim Melton, editor, International Organization for Standardization and American National Standards Institute, Jul. 1992.

IBM Corporation, "IBM Database 2: SQL Reference—for common servers", Version 2, 1994, 1995.

*Primary Examiner*—Paul V. Kulik
*Assistant Examiner*—Joan M. Corrielus
*Attorney, Agent, or Firm*—Gates & Cooper

[57] ABSTRACT

A framework for a query compiler and run-time environment for resolving a table reference to a dynamic table that is first identified at run-time but is initially unknown at compile-time. A parser parses the table reference and creates a parsed representation for the table that identifies the type of dynamic table. A code generator creates executable plans containing run-time table object representations (TAOB), from the parsed representations, that contain the type of dynamic table. The TAOB is also extended to provide for parameters that are definable at run-time, including a table ID of the actual table entity being referenced. A routine is embedded in a run-time routine that checks the type of dynamic table in the TAOB and dispatches control to one of a plurality of corresponding routines, depending upon the type of dynamic table. The corresponding routines use the extended TAOB to dynamically link the table reference to the dynamic table, depending upon the type of dynamic table. Once the dynamic table has been linked to the table reference, query processing continues as if that table were a base or derived table.

41 Claims, 9 Drawing Sheets

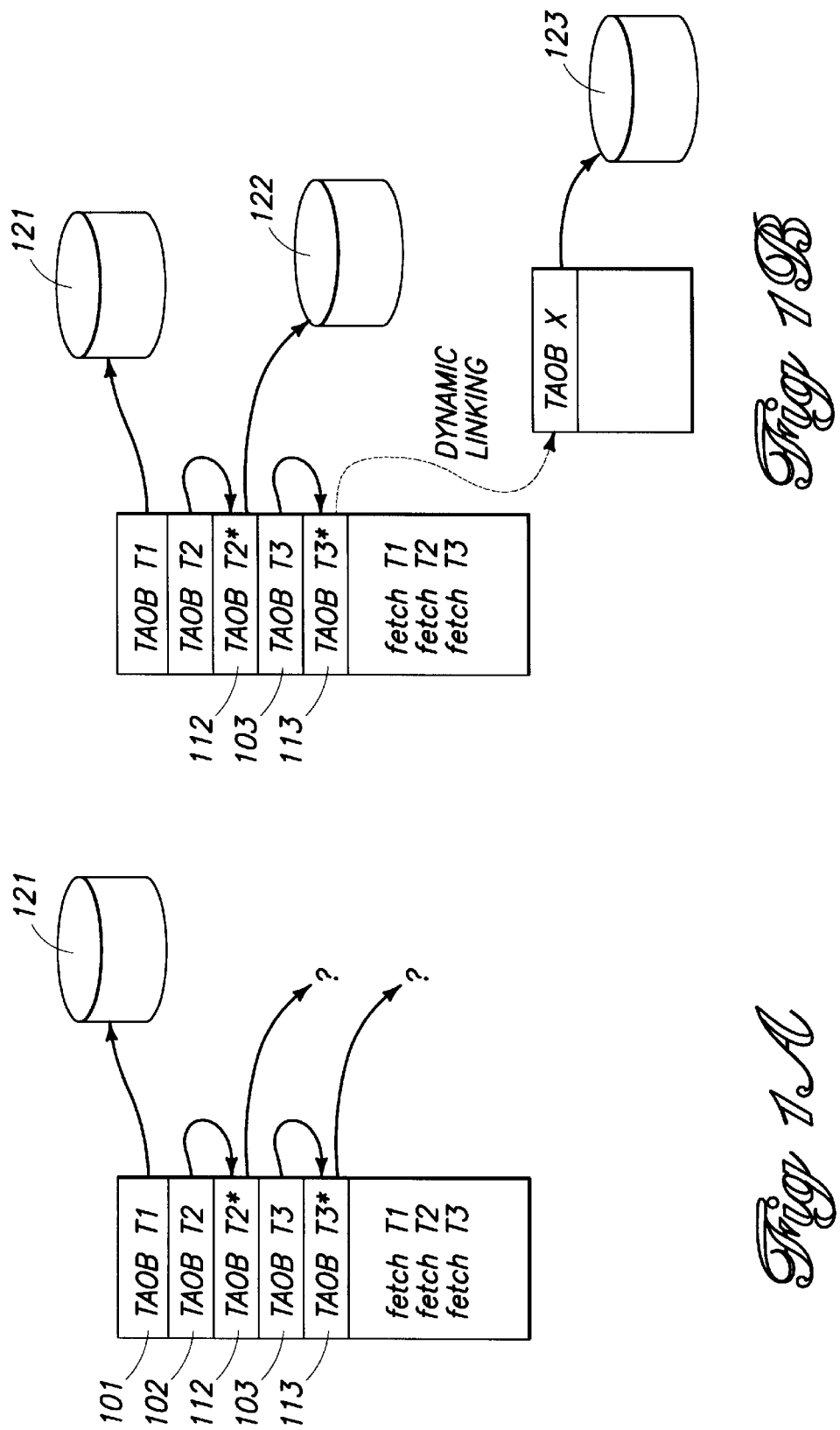

SUPPORTING DYNAMIC TABLES IN SQL QUERY COMPILERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a database management system for processing SQL queries for relational databases, and more specifically to compiling the queries and processing the queries at run-time where the queries reference a table entity that is unknown at compile time.

2. Description of the Related Art

Databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database will typically have many tables and each table will typically have multiple columns. The tables are typically stored on random access storage devices (DASD) such as magnetic or optical disk drives for semi-permanent storage.

A DBMS is structured to accept commands to store, retrieve, and delete data. One widely used and well known set of commands is called the Structured Query Language (SQL). The current SQL standard is known informally as SQL92. A new proposed standard is referred to as SQL3.

An SQL query can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across multiple tables.

Tables are at the center of a relational database engine; and a major goal of the underlying query compiler is to provide a suite of mechanisms so that user data can be easily stored and efficiently manipulated. Traditionally, two types of tables, base table and derived table, are supported in an SQL-based database server. A base table can be either user-defined for storing user data or system-defined for storing information about objects created in user databases. User-defined base tables are created explicitly by means of the create table statement, while system-defined base tables, usually referred to as catalogs, are implicitly created at the time when a user database is created. In contrast to base tables, derived tables are defined in terms of existing base tables and other derived tables. They can be defined implicitly by the system or explicitly by users. Implicitly defined derived tables are created during the execution of table operations to store intermediate results, and explicitly defined derived tables are specified by users through the use of the create view statement.

Regardless of the type and creator, tables are manipulated uniformly by means of the Data Manipulation Language (DML), such as those defined in the SQL standards. (See, (ISO-ANSI Working Draft) Database Language (SQL2); Jim Melton, editor; International Organization for Standardization and American National Standards Institute, 1992. See also, ISO/IEC JTC1/SC21 N10489, Committee Draft (CD) Database Language SQL—Part 2: SQL/Foundation; Jim Melton, editor, July 1996.)

With the rapid growth of database applications, the concept of tables has been generalized in database languages. In the upcoming SQL3 standard (see, ISO/IEC JTC1/SC21 N10489, Committee Draft (CD) Database Language SQL—Part 2: SQL/Foundation; Jim Melton, editor, July 1996), tables can be defined by means of a set-valued function written in SQL/PSM or in a host language such as C, C++, or Visual Basic. This concept is referred to as a "table function". It not only provides a more general way to compose new tables from existing tables (than through the use of view definitions), but it also allows accesses to external data using the same query mechanisms. (However, it should be noted that the usage of external table functions is restricted so that data integrity can be guaranteed.)

As such, the SQL92 standard and the upcoming SQL3 standard have defined various kinds of new table concepts that include: table functions, user-defined temporary tables, and table parameters and table result of table functions. These new table concepts create a new scenario of table usage. The actual table entity referenced by a table reference can not be known at compile-time. Any such table that is unknown at compile time that is being referenced is referred to herein as a dynamic table. Such a new table concept engenders a new challenge to both the existing query compiler for the treatment of un-resolved table references and to the existing run-time environment for the resolution of such references.

Such a problem is similar to external name references that already exist today in most programming languages. For example, dynamic binding (linking) exists today in programming languages. For example, if a program is written in C or Fortran, a programmer can define an object in one compiled module and use that object in a different compiled module where the two modules are compiled separately. At run-time there will be a binding process to link the two together.

However, traditionally in the past in the SQL language, there was no external reference to other tables defined outside of the compilation unit. In application programs, such as when the C language is used as the host program, there are individual SQL statements guarded with key words (e.g. EXEC SQL). A preprocessor goes through the program and picks up each of these statements. For each SQL statement, the preprocessor sends it to the SQL compiler. Each statement is compiled separately and is self-contained. As a result, a plan is generated which is evaluated by the interpreter at run-time to get the right results. In the past, the way a SQL program has been used has been very restrictive because it has been processed one statement at a time.

Recently there have been discussions to add more items into the SQL language to make it more powerful. These include extending the SQL language with procedural statements (e.g., IF, THEN, ELSE, GO TO, a sequence of statements, procedure, function, etc.). The SQL standards committee is also introducing more constructs for defining and using tables. Consequently, one statement can define or create a table which is accessed by another statement that is separately compiled. In essence, the problem is that there can be two SQL statements that are separately compiled that have to communicate through tables. Any such implementation to resolve this problem is different from dynamically linking objects that are separately compiled in modules written in host languages because in the problem at hand the object is not a variable or a function, it is a table. Such a new way of table references can not be handled simply and efficiently by the present level of functionality in both the existing query compiler for dealing with table references and the run-time environment for resolving them.

SUMMARY OF THE INVENTION

It is therefore an object of this invention to provide a framework for handling dynamic tables that has minimal impact on the current query compiler and run-time environment and provides minimal additional overhead in query processing.

As stated above, the SQL standards have defined various kinds of new table concepts that include table functions, user-defined temporary tables, and table parameters and table result of table functions. Also, it has been proposed that in a future release of the IBM DB2 Common Server that the standard trigger declaration be extended to allow the access of transition tables in the trigger body written in an external host language. For these new table concepts, referred to as dynamic tables herein, the actual table entity being referenced can not be known at compile-time. Hence, the system, method and program of this invention provides the capability for a dynamic table linkage to take place at run-time.

The system, method and program of this invention provides a generic framework for supporting dynamic tables in existing query compilers. All dynamic tables are viewed as table functions by the compiler. Broker functions are added into the run-time environment to establish the dynamic linkage. The generic framework of the invention can be applied to support different types of dynamic tables including external transition tables, external table functions, user-defined temporary tables, and table parameters and table result.

For such a dynamic table reference, the actual table object can not be identified at compile-time. This is different from base tables that are known. It is also different from derived tables that are known at compile time through redirection; since it is the compiler that creates the derived tables. For dynamic tables, the signature (i.e., interface) of the table is known, such as the number and type of columns, but is not known where the table is or who produces the table at run-time. The system, method and program of this invention addresses both the compile-time and run-time issues involved in this type of problem.

The compile-time issue is addressed by enhancing the existing parser representation (a query representation of a table (QTB) which is one type of object within the more general query graph model QGM) to indicate that the table object being referenced is a temporary object, i.e., a template of an actual table object not yet identified.

The run-time aspect of the invention addresses the issue of how dynamic tables can be implemented efficiently in a run-time environment. The implication is that every part of the run-time environment may be affected in the sense that whatever operation is being performed has to be aware of each new kind of table and how to handle each type of table. Each run-time operation is subjected to being examined to determine if the type of table has to be checked and how the operation will perform for each type of table.

The present invention minimizes, if not avoids, this type of overhead. Regardless of whether the table is a base table, derived table or a dynamic table including a table function, it will be derived into an extended table object (TAOB). Once a compiler generates an executable plan, there is only one representation for all types of tables, the extended TAOB. The architecture of the invention herein is not difficult to implement, it minimizes any potential increase in overhead, and it provides favorable overall performance.

In essence, the compile-time and run-time components of the invention are as follows. The query compiler will parse the table reference and create a parsed representation QTB for the table that includes an identification of the type of dynamic table. The code generator will create executable plans containing temporary run-time table object representations (TAOB), from the parsed representations, that will also contain the type of dynamic table. The TAOB that is generated is basically a template for the TAOB of the actual table entity not yet known. The TAOB is extended to provide for parameters that are definable at run-time, including a table ID of the actual table entity being referenced. A dynamic broker routine is embedded in a run-time routine (e.g., the OPEN run-time routine) that checks the type of dynamic table in the template TAOB and dispatches control to a routine to perform the dynamic linking. In a preferred embodiment, control is dispatched to one of a plurality of corresponding routines depending upon the type of dynamic table. That is, if it is a transition table, then a transition table specific linkage routine is implemented. If it is a global temporary table, then global temporary specific linkage routines are carried out. The routine to which control is dispatched will use the extended TAOB to dynamically link the table reference to the actual table entity such as by looking for the actual TAOB at the top of a run-time stack or by looking up the actual table entity in a symbol table, depending upon the type of dynamic table. Once the actual table entity has been linked to the table reference, query processing continues as if that table were a base or derived table.

In a preferred embodiment, the process of table linkage takes place at run-time during an OPEN. There is only one IF statement in the OPEN to determine if there is a dynamic table. If it is a base table or a derived table, nothing special needs to be done, i.e., processing continues as usual. Therefore, for base and derived tables, the only performance penalty is the one IF statement. This one IF statement does not actually contribute very much to performance overhead. The cost associated with an OPEN is minimal since an OPEN operation occurs only once compared to a FETCH operation which occurs many, if not millions of, times per each OPEN. In this sense, there is virtually no impact on the existing run-time environment. For the enhanced run-time part, if a dynamic table is detected at OPEN, control is dispatched to a corresponding dynamic linkage routine for the type specific dynamic linkage. Once dynamic linkage is accomplished, dynamic tables become derived tables, and, as such, there is no other special code or special treatment needed for their processing.

The system, method, and program of this invention provides a single unified architectural framework for supporting any type of dynamic table or table function. The invention is integrated harmonically with the current run-time environment. The impact on the run-time support is minimal; and providing an extended table object to accommodate these dynamic tables is easy to support.

BRIEF DESCRIPTION OF THE DRAWING

For a more complete understanding of this invention, reference is now made to the following detailed description of the embodiments as illustrated in the accompanying drawing, wherein:

FIGS. 1A and 1B is an example to illustrate dynamic linking where FIG. 1A is at compile time and FIG. 1B is at run-time;

DETAILED DESCRIPTION OF THE PREFERRED EMBODIMENTS

Figure 2A:
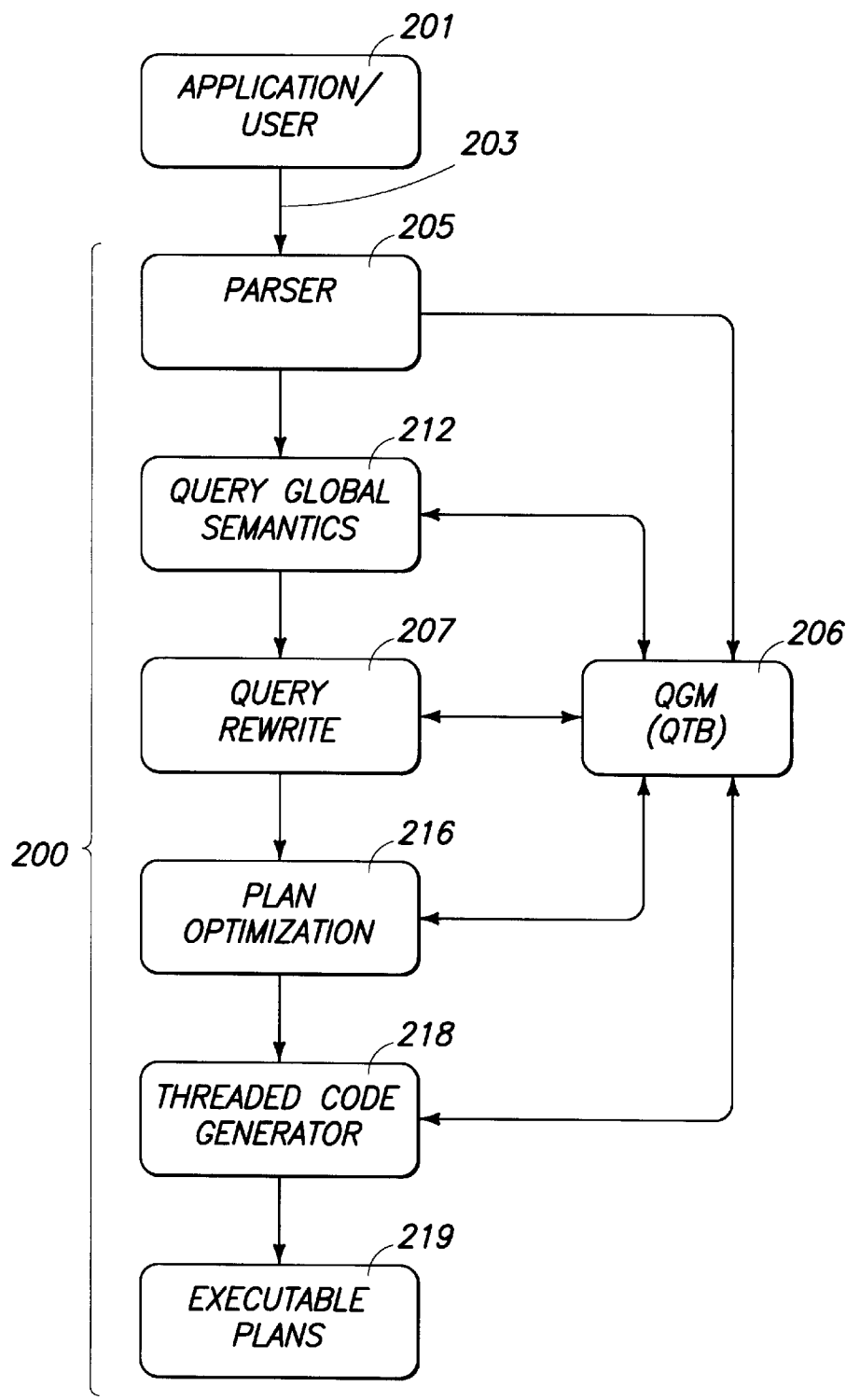
FIG. 2A is a query processing system.

An SQL query processing system is described with reference to FIGS. 2A and 2B. An application 201 issues SQL queries 203 that are parsed by the SQL parser component 205. The parser 205 generates an internal representation of the query called a query graph, i.e. a data structure (query graph model, QGM) 206. A parsed representation of a table is referred to as a QTB which is one type of object within the query graph model QGM. The QGM 206 is passed to the query global semantics 212, the query rewrite component 207, and the plan optimization 216. The query rewrite engine 207 applies transformations to rewrite the query. After the rewrite phase, 207, the query graph 206 is revised and used by the optimization phase 216. Each query is then translated into an executable plan 219 through a threaded code generator 218.

Figure 2B:
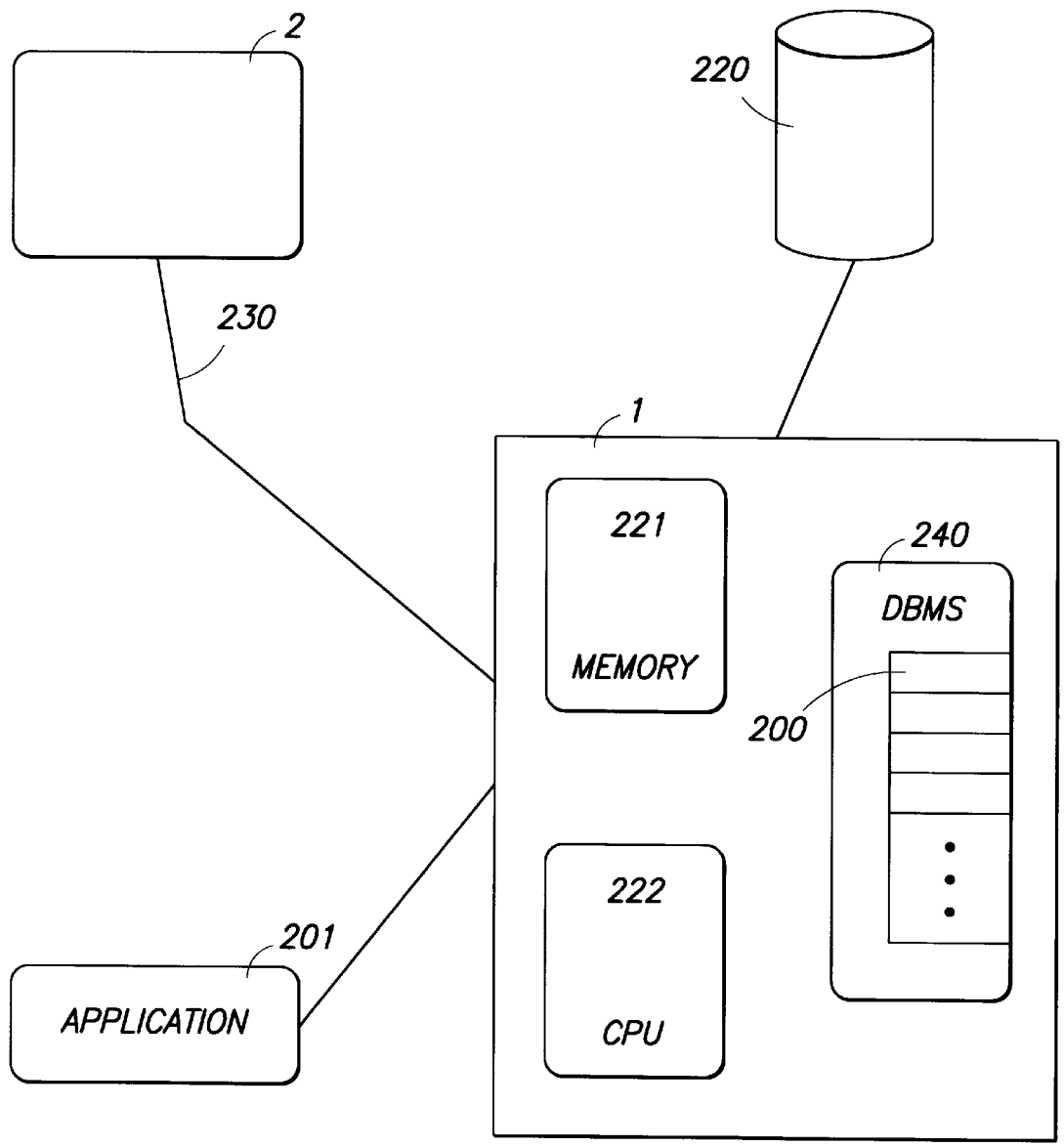
FIG. 2B illustrates a database management system in a networked environment.

FIG. 2B shows the context of the query engine 200 in a database management system (DBMS) 240 in a processing system 1 having memory 221 and at least one cpu 222. The system 1 could be connected to other systems 2 via a network 230. The application 201 could be resident on any of the systems 1, 2, in the network or could be any user connected to any one of the systems via input/output user interface devices (e.g., keyboard, display, etc.). The system, method and program of this invention is applicable to any type of database management system whether it is contained within a single system or is within a networked environment including parallel processing systems, client/server processing systems, distributed systems, etc. Although the invention herein is described in reference to relational database management systems, dynamic linking of external references is applicable and adaptable to other database systems including object oriented systems.

In addition to the discussion above of the language features proposed in the SQL standard which create new situations where tables can be defined and referenced, the system, method and program of this invention is also applicable to triggers. For example, it has been proposed that in a future release of the IBM DB2 Common Server that the standard trigger declaration be extended to allow the access of transition tables in the trigger body written in external host languages as well as the SQL language. Transition tables defined in the trigger declaration will be referenced in the external trigger body by their names as the way that they are referenced in SQL-only trigger bodies. Since the external trigger body is separately compiled from the trigger declaration by its host language processor, the SQL compiler will be invoked as before to prepare its embedded SQL statements. Now, when a reference to the transition table is encountered at prep-time, the SQL compiler only knows about the column definitions of the transition table, without knowing when and how the table will be created. Following the dynamic binding convention used in programming languages, the SQL compiler will need to "mark" transition table references as unresolved and have them resolved at the time when the trigger body is given the actual table entities for execution. Such a new way of table references in external triggers can not be handled simply and efficiently by the present level of functionality in both the existing query compiler for dealing with transition table references and the run-time environment for resolving them.

Along with external triggers discussed above, global temporary table, local temporary table, declared local temporary table, as well as table parameters and table result of table functions defined in the upcoming SQL standards all share the same kind of issue; namely, the exact table entity of table references is not known at compile-time. The system, method, and program of this invention provides a process for a dynamic linkage to take place at run-time. For convenience, the above mentioned types of tables are called dynamic tables to reflect the fact that the linkage between the table creation and the table reference takes place dynamically as opposed to statically.

To illustrate this more clearly, consider the plan in FIG. 1A, where there are three table references 101, 102, 103 and each operates on a table object (indicated by TAOB) allocated in the executable plan. T1, 101, is a base table, T2, 102, is a compiler-generated derived table for intermediate results, and T3, 103, is a table which is created at run-time (such as a transition table or a global temporary table). Note that T2 and T3 have an attribute pointing to the real target table object, T2*, 112, and T3*, 113, respectively. This indirection is used so that when the actual target table is known, only the TAOB of T2*, 112, (or T3*, 113) has to be updated. The exact target table, 121, of T1, 101, can be determined at compile time, while the real target table of T2, 102, and T3, 103, can not. At run-time, shown in FIG. 1B, the data manager creates a temporary table, 122, for T2* and fills in the entity in its TAOB, 112. On the other hand, the entity, 123, of T3*, 113, might have been created by some other plan, or other part of the run-time system, and a run-time support must establish the needed link. This process of linking table references 103 to its real table entity 123, such as the case of T3, called dynamic linking, is the subject of the invention presented herein.

The system, method, and program of this invention provides a generic mechanism by which dynamic linking can be efficiently performed for various dynamic tables through aspects of their commonality. A preferred embodiment of the invention uses the DB2 Common Server code base for table functions, external triggers, and global temporary tables.

The invention addresses compile-time issues and run-time issues associated with the problem of linking table references to their real table entity.

First, the compile-time issue involves the kind of representation QTB that the parser will generate. From the view point of a SQL compiler that already supports table functions, a dynamic table reference can be viewed as an invocation to a table function whose functionality is fully determined by the type of the dynamic table. Therefore, by mapping a dynamic table reference to the representation of the corresponding table function during the parser component, the existence of dynamic tables can be made transparent to the other components of the compiler.

Secondly, the run-time issue involves how the dynamic linking can be efficiently performed with minimal impact on the existing run-time environment. In this invention, a new functional component, dynamic broker, is invoked to dynamically link unresolved table references. In a preferred embodiment, the dynamic broker is invoked if and only if a dynamic table is manipulated (normally opened) for the first time. By this way, there is little impact on the existing run-time code.

Based on the aforementioned discussion, a uniform framework has been devised for the dynamic table linkage problem. Various preferred embodiments can be made in the context of external table functions, external triggers, and global temporary tables.

A preferred embodiment will be discussed by illustrating in detail how transition tables and user-defined temporary tables can be supported using the framework of this invention. The compile time support for dynamic tables is also discussed. An extended run-time environment for the dynamic linkage of various dynamic tables is also shown and described.

An Extended Table Representation

Figure 3:
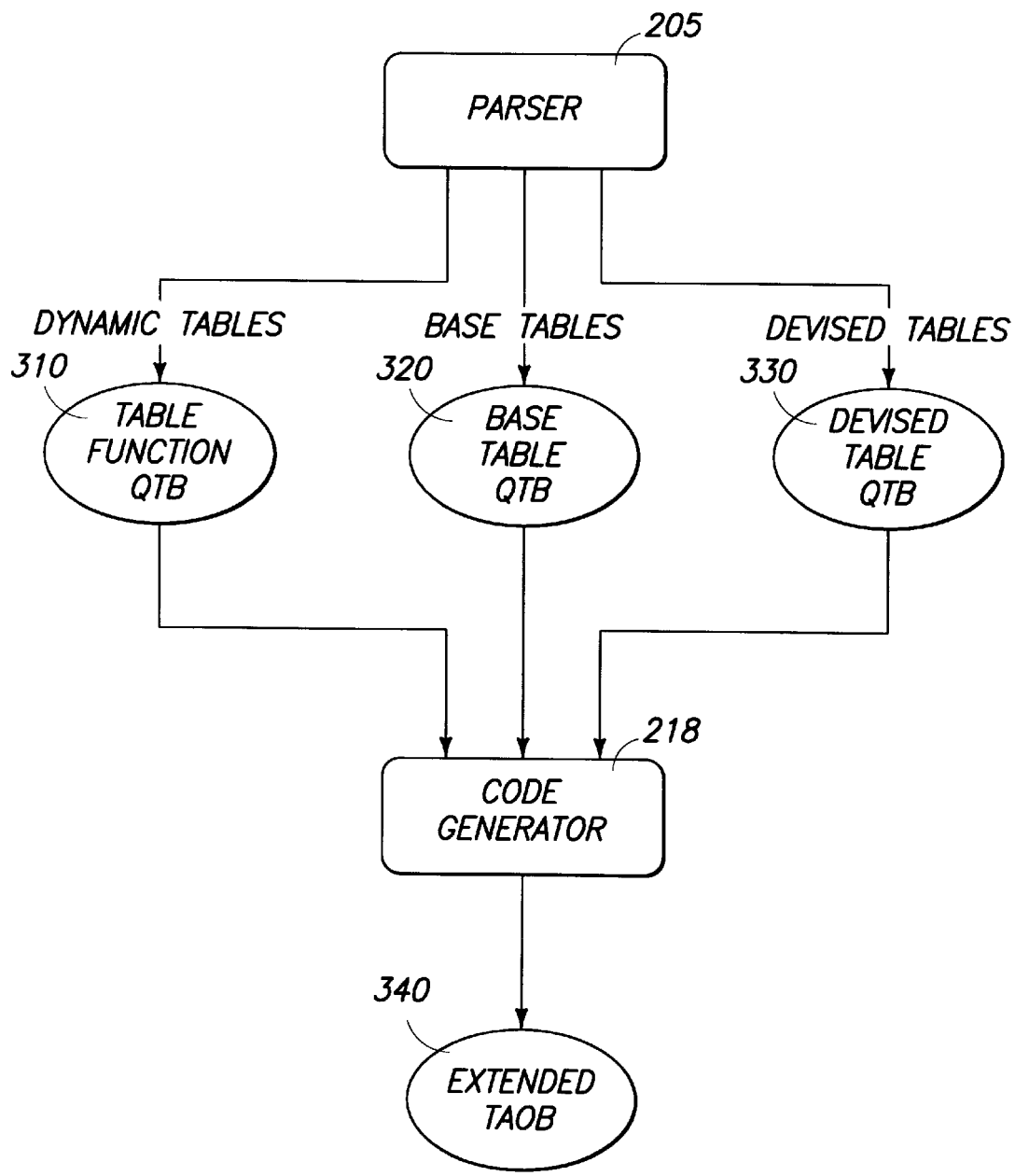
FIG. 3 illustrates the compile-time enhancements to the query processing system of FIG. 2 where dynamic tables are mapped to table functions and extended table objects (TAOBs)

Today, there is already a notion of base tables, derived tables and table functions. In this invention, the table function is generalized to cover the scenario of dynamic tables. A table function is a function that produces a table. The function is typically written by a user in whatever language the user chooses, so it is sitting outside of the database. At compile time, the actual table object of the table function is not known. Different types of dynamic tables all share this same type of scenario. In this invention, all types of dynamic tables are unified by using table functions. The compiler marks the QTB for a table function to classify the type of dynamic table that it is (e.g., a real table function, a transition table, a global temporary table, etc.). As shown in FIG. 3, different dynamic tables are unified and treated as one, and handled and represented with a small enhancement to table functions 310, i.e., the compiler marks the QTB as the type of dynamic table. This same information is transformed into an extended TAOB 340 by the code generator to carry the information to the run-time environment.

Handling dynamic tables as table functions which produce tables at run-time based on the information available at compile-time is a uniform way of viewing all kinds of dynamic tables. The existing table representation of executable plans is extended to handle table functions as further described. For convenience, the terminology of DB2 Common Server (see, IBM DATABASE 2 SQL Reference—for common servers Version 2, IBM Corporation, 1995) will be used to explain a preferred embodiment of the invention. It is clear that the invention described herein is just as applicable to other systems.

In DB2 Common Server, each SQL statement is compiled into an access section (executable plan) that consists of a set of run-time objects operated by a thread of operators. From a dataflow's view point, the main logic of a thread is to progressively construct intermediate tables by applying its operators on the incoming tables which are already materialized. Therefore, all of the table objects of an access section form a directed graph where nodes are table objects. A directed edge exists between two nodes if and only if they are dataflow-connected. For convenience, nodes that have no incoming edge are called terminal tables, and nodes with at least one incoming edge are called intermediate tables. Currently, a terminal table corresponds to a base table. (In DB2 Common Server, a terminal table can also be a constant table, such as one from a constant VALUES clause.) An intermediate table corresponds to a derived table produced by table operations such as fetch, insert, delete, update, sort, join, etc. The execution of an access section proceeds bottom-up from the output of terminal tables to the output of the top table. Since terminal tables are pre-materialized tables, the access section is self-contained and fully specifies a materialization plan for the output table of an SQL statement.

Existing Representation of Table Objects

A table object (TAOB) is a run-time descriptor for the corresponding table reference. Some of the table attributes are known and set in the TAOB at compile-time (from the catalog or the SQL statement context). These table attributes include the table type and table ID of a base table, the active column buffer areas, the associated SARGable predicate, etc. (Note, a SARGable predicate is a predicate that can be pushed down to the DMS run-time for performance reasons.) Some other TAOB attributes are used to keep track of the run-time state of a table, such as current record ID, number of fetched records, status of last operation, etc. Hereinbelow are describe some of the important table attributes grouped into four categories for the convenience of presentation: basic, base table specifics, temporary table specifics, and run-time.

Basic Attributes

Basic attributes apply to all types of TAOBs. The type of a TAOB is indicated by the type attribute. Possible values of a type attribute are temporary and base. Regardless of its type, a TAOB also holds its own buffer area for the data accessed at run-time; the number_of_columns attribute and the column_array attribute are used for this purpose. Each created table in the system is associated with a table_id, as an unique identification in the underlying database. For base tables, the table ID is known at compile-time and is set in the TAOB by the code generator. On the other hand, the actual table ID for a temporary table is set at run-time when the temporary table is actually created.

Base Table Specific Attributes

In addition to the basic attributes, a base table TAOB always contains the schema name (schema_name) and the table name (table_name) of the subject table.

Temporary Table Specific Attributes

Similarly, there are several attributes that are specific to temporary TAOBs. As described earlier, when a temporary table is created at run-time, its table ID is determined and recorded in the corresponding TAOB. All table operations (scan, insert, delete, update, etc) on this temporary table are associated with their own separate TAOBs which have an attribute temporary_table pointing to the TAOB of the target temporary table. Thus, after the target temporary table is created, all table operations on it will see the same target table id through their own TAOB indirectly.

Run-time Attributes

Some important table attributes that are updated at run-time to record the status of a table operation are described. Many table operations are scan-based in the sense that the target table has to be scanned (relation scan or index scan) before the desired location can be located. Such operations include (but are not limited to) fetch, delete, update, sort and join. To maintain the current state of a particular scan, the DMS component of DB2 Common Server creates a handle structure at the time the target table is opened. This handle structure keeps track of the position-sensitive information at the data access level. Therefore, after a table is opened, the handle attribute will be used as the identification to the target table for scan-based operations. For non-scan table operations (e.g. insert operation), however, the table ID is used exclusively as the identification of the target table.

There is a record_id attribute that keeps the last record id fetched. There is also a status attribute that keeps the current status of the table operation, for example, table_closed, table_opened, record_found, reset_scan_to_group_start, end_of_table, and end_of_group.

New Attributes for Table Functions

The system, method, and program of this invention treat table functions as a new kind of terminal tables. However, unlike ordinary terminal tables, table functions take as inputs a set of "parameters" which are obtained at compile-time from the context of the SQL statement or from the system catalog. They are encapsulated in the underlying abstract representation and eventually recorded in the executable plan as part of the corresponding TAOB. The kind of information that needs to be passed into the table function varies:

table functions: The function object (UFOB) for external table functions or access plan for internal table functions.

transition tables: The type of transition table (old or new), the associated trigger name, and the associated base table name.

user-defined temporary tables: The type of the temporary table (global, local, or declared local) and associated table name.

table parameters and table result: The type of the parameter (in, out, inout, or result) and the column definitions of the parameter.

To record these parameters in the executable plan, the present invention extends the TAOB as follows. First, the type attribute is overloaded with new values. In addition to the values base and temporary, there is also the values table function, transition table, user-defined temporary table, and table parameter. Second, a dynamic table descriptor, dt_cb, is also added to the TAOB as the common control block for dynamic tables. For base tables and derived tables, this is set to null. The dynamic table descriptor contains the following information:

subtype:

The subtype attribute is an extension to the table type. For table functions, the subtype attribute indicates whether it is an internal or an external table function. For table parameters, the subtype takes one of the following values: input, output, inout, and result. For transition tables, the subtype is either new or old. The subtype of a user-defined temporary table can be either global, local, or declared local.

table schema and table name:

This is the schema and name of the table with which the underlying dynamic table is associated. It applies only to transition tables and user-defined temporary tables.

trigger schema and trigger name:

For a transition table, this attribute further describes the schema name and trigger name of the trigger where it is declared.

external function object:

This attribute points to the UFOB function descriptor of the corresponding external function invocation.

In the following section, it will be shown how the extended TAOB described here is used at run-time to fulfill the dynamic linkage between the actual table entities and the unresolved table references.

The Extended Run-time Environment

Figure 4:
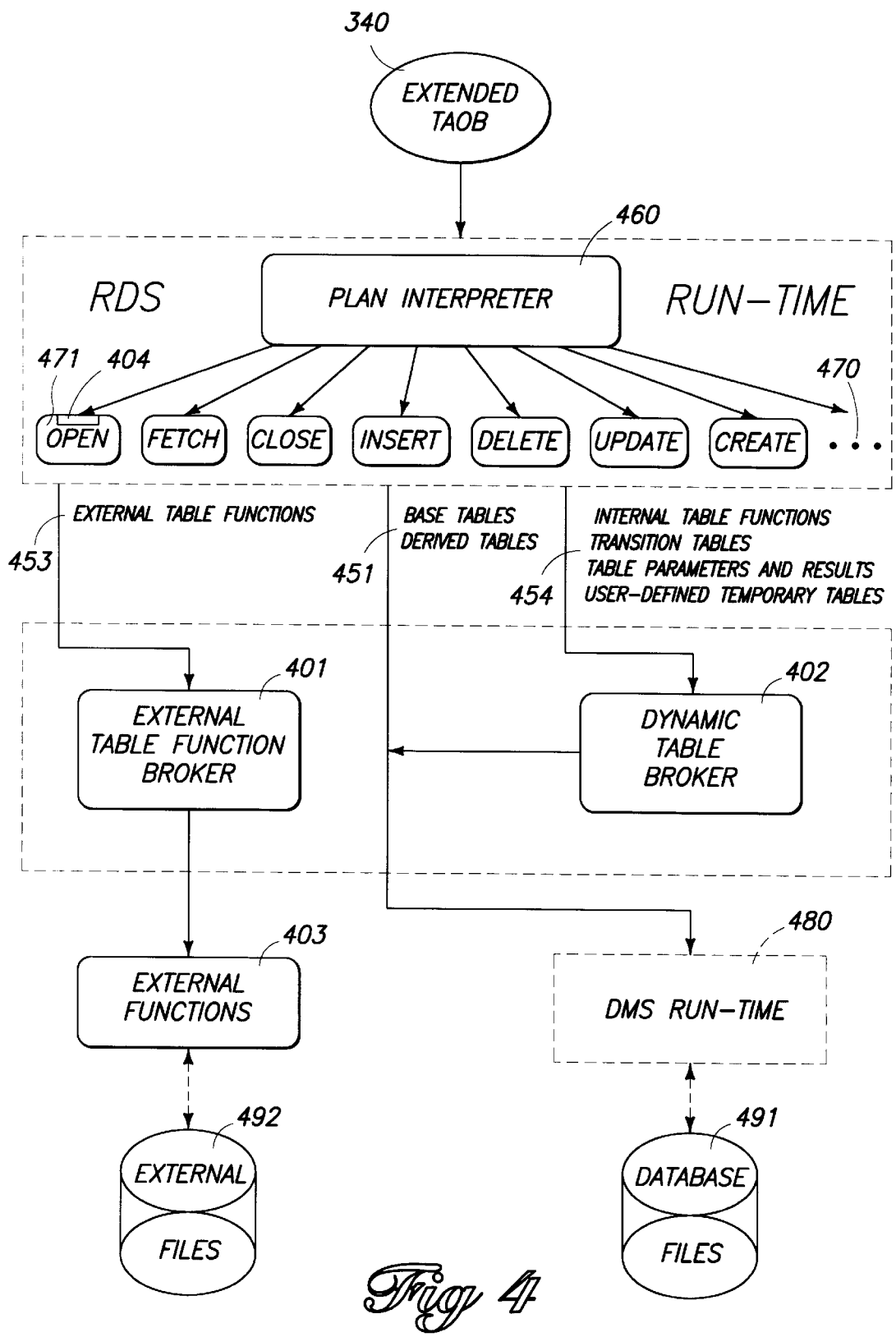
FIG. 4 illustrates the enhancements to the run-time system environment including the dynamic table broker.

FIG. 4 illustrates the extended run-time environment for supporting dynamic tables. In the general architecture of this invention, external table functions 453 are treated as one type of dynamic table 454. As indicated in this diagram, operations on base tables and derived tables 451 will be processed as usual; i.e., the interpreter 460 invokes the corresponding RDS run-time routine 470 which will in turn invoke the DMS routines 480 to perform the necessary data access to the database files 491. Since the TAOBs of the subject tables have already "linked" to the corresponding table entity at compiled-time (for base tables) or at run-time (for derived tables), no special treatment is needed on behalf of the underlying table operation. In contrast, operations on dynamic tables can not be performed before the target TAOB is resolved to the desired table entity. The broker component 402 in FIG. 4 carries out such a dynamic linking process for dynamic tables 454.

Run-time Routines

Table entities, base or derived, need to be created before any operation is applied. Base tables are created by the time the underlying SQL statement is compiled. Therefore, the actual table ID is stored in the corresponding TAOBs by the query compiler. In contrast, derived tables are "computed" from other tables and hence are created at run-time when the table expression that defines the table is evaluated. Table entities created for derived tables are also referred to as temporary tables, as they are dropped after the current statement is executed. Typically, temporary tables are implicitly created at the first time it is populated. The table ID of the temporary table being created is recorded in the TAOB so that it can be used, directly or indirectly, by the subsequent table operations.

Prior to the application of a table operation, the corresponding table has to be opened to render the per-operation working areas initialized on behalf of the current operation. This is accomplished by invoking the open table run-time routine, explicitly or implicitly. This run-time routine will use the table ID obtained from the TAOB to invoke the lower-level DMS routines to initialize the aforementioned working areas. For convenience, pointers to these working areas are also recorded in the TAOB. The open table run-time routine is invoked either explicitly from the interpreter for a fetch operation or implicitly from other run-time routines for scan-based table operations such as delete and update. Symmetric to the open table routine is the close table routine which is invoked at the end of a table operation to release the working areas.

Run-time routines for fetch, insert, delete, update, join, sort, etc, are invoked explicitly from the interpreter. The interface between the interpreter and these routines is relational in that all the parameters represent some aspect of a relation or table. More precisely, the TAOBs identify the tables involved in the operation, the input buffer holds the tuple to be passed into the database engine, the output buffer holds the tuple retrieved by the database engine, and the predicate serves as a filter for the tuples accessed by the current table operation. These routines will then communicate with the lower-level DMS routines using a file-oriented interface. In other words, all the relational aspects are translated into the corresponding concepts at the level of file access; TAOB corresponds to table space and file, tuples correspond to file offsets, etc. Through the collaboration between the RDS and the DMS components, table operations are interpreted and executed.

To support dynamic tables in a preferred embodiment, a dispatcher 404 is embedded in the very beginning of the open table 471 run-time routine. In other embodiments, the dispatcher may be embedded in any run-time routine. This dispatcher 404 will check the type attribute of the TAOB 340, and will dispatch the control depending on the underlying table type. If the type indicates that it's a base table or a derived table operation 451, then nothing special needs to be done; it will proceed to exercise the existing logic. On the other hand, in the case of a external table function 453, the control will be passed to the external table function broker 401 which will render the table to be initialized (the open routine), the tuple to be produced (the fetch routine), or the table to be closed (the close routine). For other kinds of dynamic tables 454, the control is passed to the dynamic table broker 402 for the linkage of unresolved table references. After the table linkage is accomplished, the control will proceed as if the underlying table were a base table or a derived table.

The Dynamic Table Broker

As implied by its name, the dynamic table broker 402 (FIG. 4) is responsible for resolving a dynamic table reference to the corresponding table entity which only becomes known at run-time. The dynamic broker dispatches control at run-time to a linking routine depending upon the type of dynamic table. There is no explicit invocation of the broker. In a preferred embodiment, the dynamic broker is invoked on demand when a dynamic table is opened for a table operation. It is built into the run-time for an OPEN table operation. The first statement in the run-time routine for OPEN is an IF statement that tests whether there is a dynamic table and there is a need for a dynamic linkage. If there is, then a routine corresponding to the type of dynamic table is used to perform the dynamic linking. When it is invoked, the broker collaborates with the database engine to find the desired table entity to which the table reference will be dynamically linked. The linkage between the table reference and the actual table entity is recorded by updating the table attributes of the TAOB with the information about the actual table entity. Although different types of dynamic tables demand different attribute settings, the table ID of the table entity is always required in the dynamic linking process. The following C-like pseudo code demonstrates the basic logic of the dynamic table broker:

```
IF access_taob.type is a dynamic table
  THEN
    switch access_taob.type {
      case TRANSITION_TABLE:
        link_transition_table(access_taob);
        break;
      case USER_DEFINED_TEMPORARY_TABLE:
        link_user_defined_temporary_table(access_taob);
        break;
      case TABLE_PARAMETER:
        link_table_parameter(access_taob);
        break;
    }
  ELSE follow original logic
            Copyright IBM Corporation 1996
``` where link_transition_table( ), link_user_defined_temporary_table( ), and link_table_parameter( ) perform the actual table linkage for a transition table reference, a user-defined temporary table reference, and a table parameter or a table result, respectively. It is the focus of the following two sections to describe in detail how the first two routines are implemented. It should be noted that although the preferred embodiment has a plurality of routines depending upon the table type, other embodiments could use just one routine to perform the dynamic linking.

External Transition Tables

Transition tables are temporary tables that capture the state of affected rows when the triggering SQL operation is applied to a table. More specifically, the old transition table contains the value of affected rows prior to the application of an update or a delete operation, and the new transition table contains the value of affected rows that will be (or were) used in an update or a insert operation. Each time a triggering operation (insert, delete, or update) is applied to the database engine, the transition tables are created and populated with the rows that are determined by the type of the transition table, the triggering operation, and the current content of the subject table.

Figure 5:
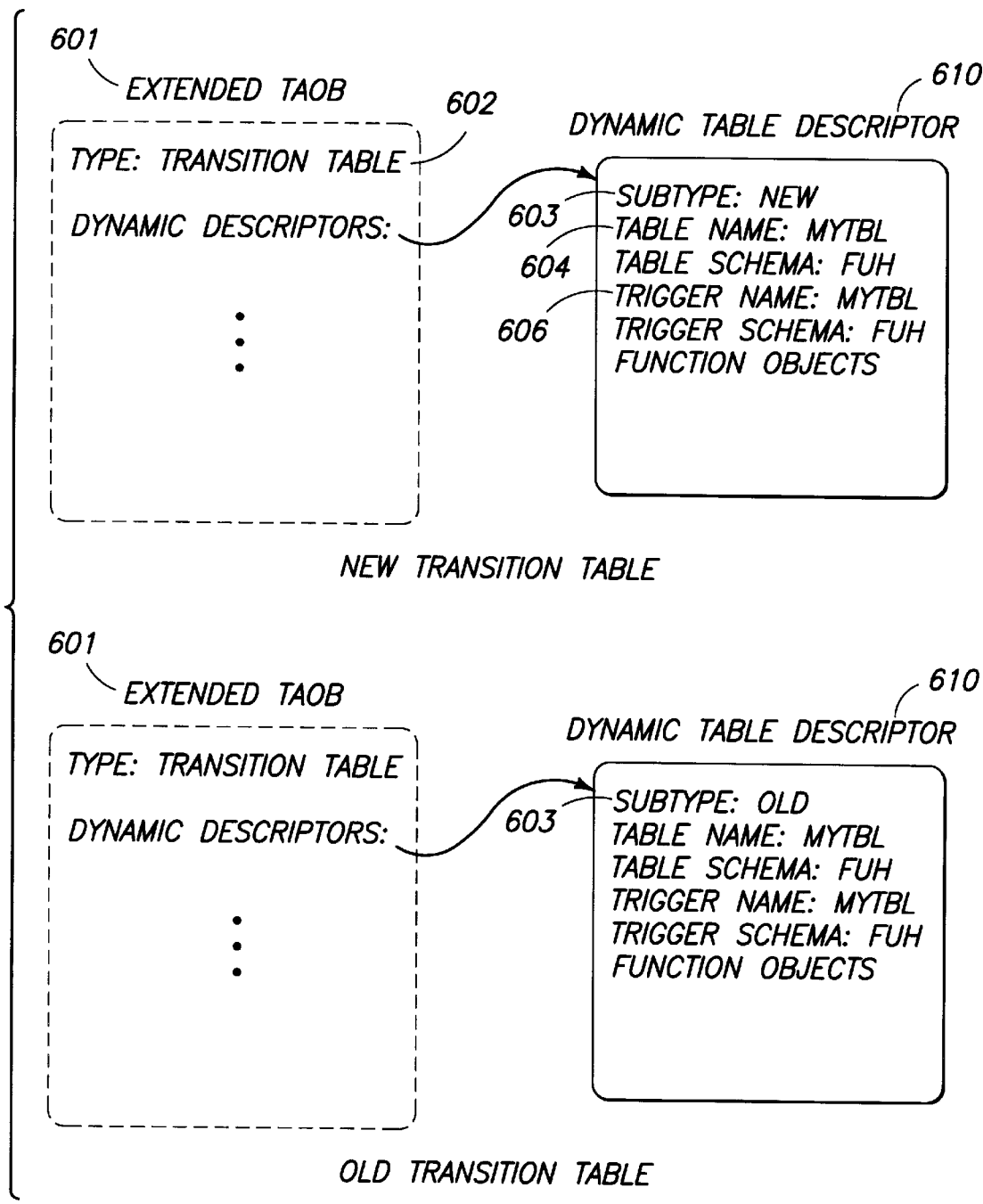
FIG. 5 illustrates extended TAOBs for transition tables.

To facilitate the dynamic linking of transition table references appearing in an external trigger body, the TAOB of the transition table is marked by the query compiler as of type "transition table" 602 (FIG. 5). In addition, the subtype 603 (new or old) of the transition table and the name of the associated trigger 606 and base table 604 are also recorded in the corresponding dynamic table descriptor 610. The following example shows a create trigger statement whose transition tables are represented by the TAOB 601 in FIG. 5.

```
CREATE TRIGGER fuh.mytrig
    AFTER UPDATE OF c1, c2 ON fuh.mytb1
    REFERENCING NEW_TABLE AS nt
               OLD_TABLE AS ot
    FOR EACH STATEMENT
    MODE DB2SQL
    BEGIN
      ...
    END
```

Transition tables are created and populated in the executable plan for the triggering SQL operation. Let the table fuh.mytbl consist of five rows, {(1, 100),(2, 10),(3, −1001), (4, 331), (5,−5)}, and fuh.mytrig be the trigger as shown in the previous example. The following update statement will be "compiled" in-line with the trigger body of fuh.mytrig to produce a combined executable plan which will create the transition tables and get them populated by the value of affected rows. (It should be noted that in some implementations, a trigger body is compiled into an independent plan which is invoked through a function call from the executable plan of the triggering operation.) Therefore, the following update statement:

UPDATE fuh.mytbl SET c2=−c2 WHERE c2<0 will render the transition tables nt and ot to be created and populated with the following rows.

nt={(3, 1001), (5, 5)} ot={(3, −1001), (5, −5)}

Two facts deserve more attention. First, these transition tables are created in an executable plan different from those of the external trigger body. Therefore, they have to be recorded somewhere so that the dynamic table broker routine, link_transition_table( ), will be able to find it later on when an unresolved reference to the transition table is encountered. Second, the activations of triggers can be nested just like normal procedure calls. Therefore, the created transition tables have to be recorded in a way so that the "innermost" ones always get the precedence. The preferred embodiment accomplishes this by maintaining the transition tables in a global stack. The TAOBs for the transition tables are pushed into the stack when the trigger body is entered and popped out of the stack at trigger body exit.

The producer of the transition table, once the table is produced, directly stores all of the information about the table into the actual table object, i.e., it is pushed into the run-time stack. On the consumer side, when an alias to the table object (i.e., the template table object) is referenced, this will kick off the dynamic linking process which will access the actual table object from the top of the run-time stack. Information from the actual table object is moved into the template table object.

The above has described the run-time stack for transition tables; the following describes the dynamic linking process.

The dynamic table broker always looks up the top entry of the run-time stack for the actual table entity and modifies the table attributes of the underlying template TAOB accordingly. The set of table attributes that are modified varies from one implementation to another.

The template table object can be used to represent or identify the actual table object, including where it can be found, how many columns there are, where the buffers that hold the columns of the record are, the type of table, and run-time stats that indicate the state of the table access (open, close, fully populated in memory or partially populated). The dynamic linkage process will at least determine the actual table location. In DB2 common server for each table there is associated three id's, 1)a node id in the parallel environment, 2) a pool id, which is similar to a directory, and 3) an object id. Using these three id's, the table location can be uniquely identified. Once the dynamic linkage is accomplished, that table is transformed into a derived table (since the location is now known) which also requires certain information to be moved at dynamic linking time.

Typically, table type (derived) and table ID are always changed to the value obtained from the TAOB of the actual transition table entity. In some implementations (see, IBM DATABASE 2 SQL Reference—for common servers Version 2, IBM Corporation, 1995), columns of the actual table entities are ordered differently from the corresponding table accesses. In such a case, more effort is needed to map the table columns of the accessing TAOBs to the corresponding columns of the actual TAOBs.

To summarize, the following C-like pseudo code is given for the main logic of the dynamic table broker routine link_transition_table( ).

```
link_transition_table(access_taob)
{
    TAOB actual_taob;
    /* (1) look up the run-time stack */
    if (access_taob->dt_cb.subtype == NEW)
        actual_taob = tran_tb1_stack[top].new;
    else
        actual_taob = tran_tb1_stack[top].old;
    /* (2) minimum attributes copy */
    access_taob->type = actual_taob->type;
    access_taob->id = actual_taob->id;
    /* (3) more attributes copy, implementation-dependent */
    modify_other_attributes(access_taob, actual_taob);
}
                Copyright IBM Corporation 1996
```

The above routine performs the dynamic linkage for transition tables. The routine is invoked when the trigger body written in a 3GL language (not SQL language) is invoked. The very first time either the new or old transition table is referenced, it will go through the OPEN, FETCH, CLOSE paradigm. At the OPEN time, it is detected whether it is a transition table. Then a link_transition_table routine is invoked by passing in the information that it needs. What is passed in is a template of the extended table object (TAOB) because it does not contain the information necessary to locate the table, but it does contain information to describe what it is. The first IF statement states that if the control block subparts indicate that it is a new transition table, then it references the new transition table entry at the top of the stack. The actual table object is accessed. In step 2 the minimal attributes are copied. Step 3 is implementation dependent.

This section concludes with an example. Let t1, t2, and t3 be tables with numeric columns c1 and c2, and trig1 and trig2 be the after update for each statement trigger for t1 and t2 respectively. Moreover, it is assumed that trig1 processes only the new transition table nt, and trig2 processes both the new and old transition tables nt and ot.

```
CREATE TRIGGER trig1 AFTER UPDATE ON t1
    REFERENCING NEW_TABLE AS nt
    FOR EACH STATEMENT MODE DB2SQL
    LANGUAGE C
BEGIN
    int i, j;
    .
    .
    .
    EXEC SQL
        CASE (SELECT (COUNT(*) FROM nt)
            WHEN 2: UPDATE t2 SET c2 = c2 * c2 WHERE c2 < 0;
        END CASE;
    .
    .
    .
END
CREATE TRIGGER trig2 AFTER UPDATE ON t2
    REFERENCING NEW_TABLE AS nt OLD_TABLE AS ot
    FOR EACH STATEMENT MODE DB2SQL
    LANGUAGE C
BEGIN
    char *buf;
    .
    .
    .
    EXEC SQL
        INSERT INTO t3 SELECT nt.c1, ot.c2 FROM nt, ot;
    .
    .
    .
END
```

Let the content of t1 and t2 be {(1, 100), (2, 10), (3, −1001), (4, 331), (5, −5)} and {(6, 100), (7, 10), (8, −1001), (9, 331), (10, −5)} respectively. The following update operation will fire trig1 which will in turn fire trig2.

UPDATE t1 SET c2=−c2 WHERE c2<0

Figure 6:
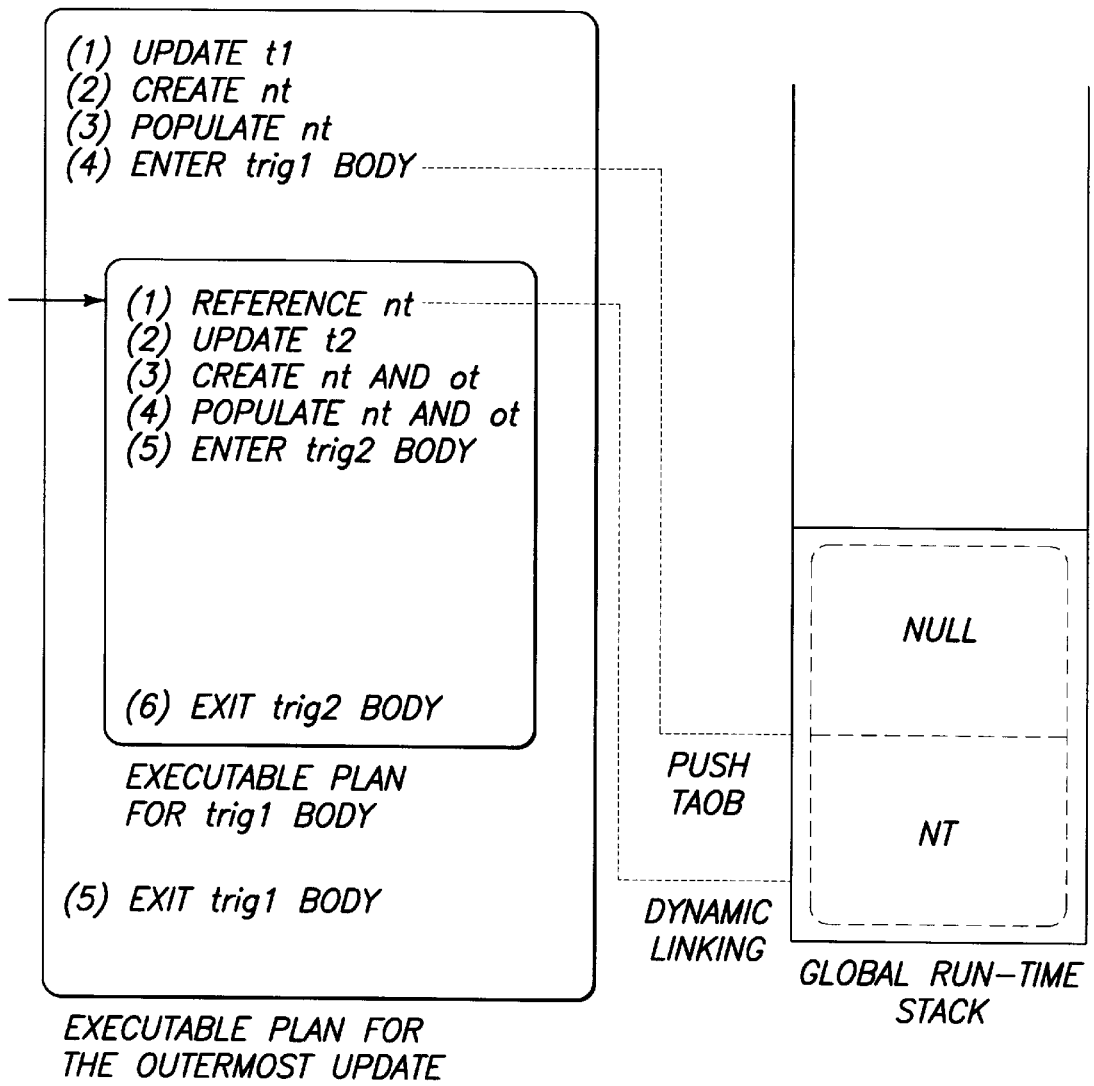
FIG. 6 is a run-time configuration and dynamic linking after trig1 is entered.
Figure 7:
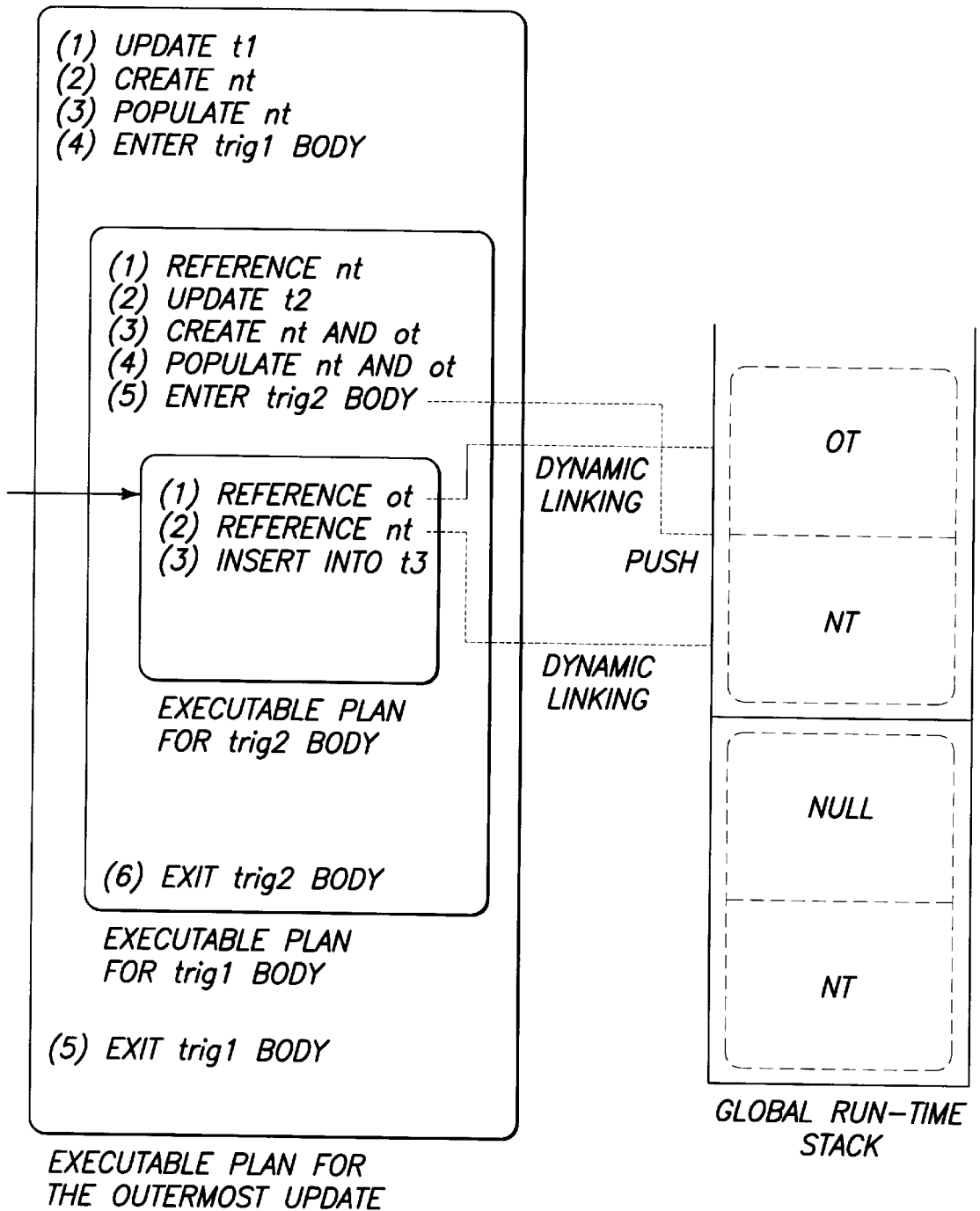
FIG. 7 is a run-time configuration and dynamic linking after trig2 is entered.

The run-time configuration and the dynamic linking process are shown in FIG. 6 when trig1 is fired, and in FIG. 7 when trig2 is also fired.

User-Defined Temporary Tables

A global temporary table is a user-defined temporary table shared by all SQL operations in a database connection session. As suggested by its name, global temporary tables possess two important characteristics, namely, being global and temporary. It is "global" in that changes on a particular global temporary table are immediate and visible by subsequent operations of the same database connection. It is "temporary" in that the content of a global temporary table only persists in a database connection; all the rows inserted into the table are deleted at the end of a connection session and the table becomes empty. Another important characteristic of global temporary tables is that they are not sharable among different connection sessions regardless of whether these sessions are sequential or concurrent. These characteristics can be best understood through an example. Let gtt be a global temporary table and t1 and t2 be two base tables with identical column definitions as that of gtt. The following database connections, sequential or concurrent, will populate t1 and t2 with the rows as shown below.

| * Connection I * | * Connection II * |
|---|---|
| connect to db; | connect to db; |
| insert into gtt values (1, 2); | insert into gtt values (3, 6); |
| insert into gtt values (2, 4); | insert into gtt values (4, 8); |
| insert into t1 select * from gtt; | insert into t2 select * from gtt; |
| connect reset; | connect reset; |
| *** Result I *** | *** Result II *** |
| t1 = {(1, 2), (2, 4)} | t2 = {(3, 6), (4, 8)} |

Figure 8:
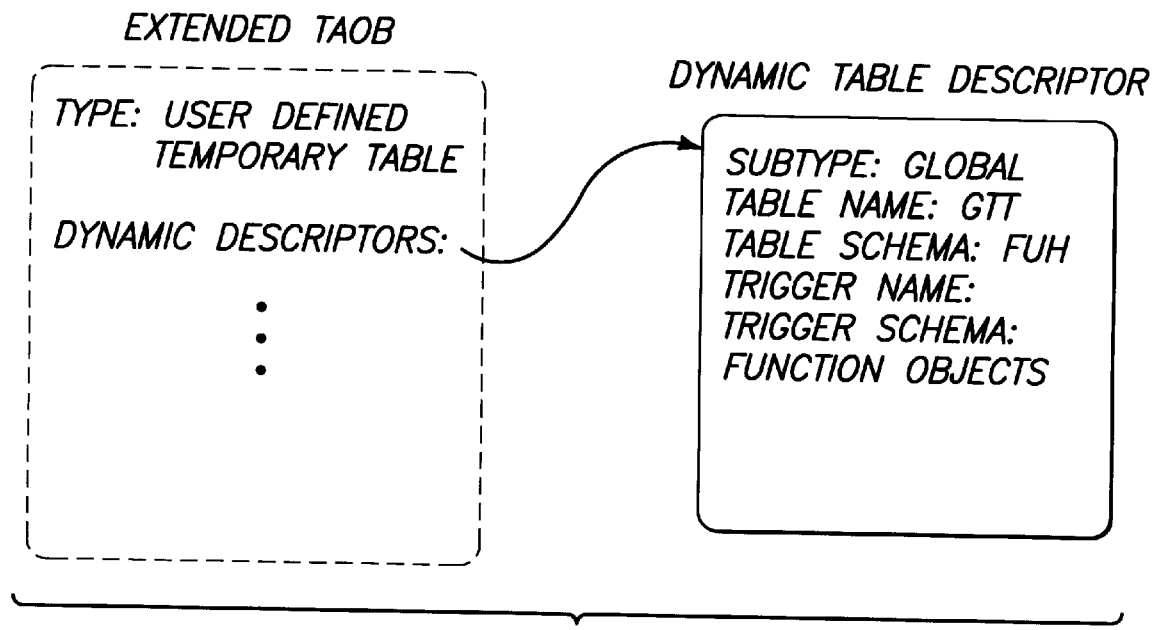
FIG. 8 illustrates an extended TAOB for a global temporary table.

The semantics described in the previous paragraph are preserved in the preferred embodiment of this invention which implements global temporary tables in existing relational database servers. Similar to the treatment of the transition table references, access to a global temporary table will be compiled into an extended TAOB with appropriate information recorded as shown in FIG. 8.

When a global temporary table is opened on behalf of an SQL operation, the dynamic table broker routine link_user_defined_temporary_table, will look up the actual table entity in a global symbol table located in the per-connection working area (e.g. the agent control block of DB2/CS). If it is found, the TAOB of the actual table entity is used to perform the dynamic table linkage. If it is not found, it is created and entered into the symbol table for subsequent lookups. The TAOB of the newly created table entity is then used to perform the dynamic table linkage for the underlying table access. The details of the table linkage is identical to that of transition table reference in the previous section entitled "External Transition Tables." As before, the following C-like pseudo code is used for outlining the main logic of the dynamic table broker routine link_user_defined_temporary_table( ).

```
link_user_defined_temporary_table(access_taob)
{
    switch (access_taob->dt_cb.subtype) {
        case GLOBAL:
        {
            TAOB actual_taob;
            /* 1. look up the global symbol table */
            actual_taob = find_global_temporary_table(access_taob);
            /* 2. create the global temporary table, if not created
                  yet */
            if (actual_taob == NULL)
                actual_taob =
create_global_temporary_table(access_taob);
            /* 3 minimum attributes copy */
            access_taob->type = actual_taob->type;
            access_taob->id = actual_taob->id;
            /* 4. more attributes copy; implementation-dependent */
            modify_other_attributes(access_taob, actual_taob);
        }
        break;
        case TEMPORARY:
        {
            ...
        }
    }
}
                    Copyright IBM Corporation 1996
```

At the end of a database connection, the database engine will traverse the global symbol table and drop all the table entities created on behalf of global temporary table accesses in that connection session.

SQL92 standard also defines two variations of user-defined temporary table concept: created local temporary table and declared local temporary table with different scopes. Created local temporary tables are shared among all the SQL operations belonging to the same compilation unit while declared local temporary tables are shared only within a basic module. Therefore, the dynamic table linking for these two table concepts does not introduce new issues and are not separately described herein.

Although not specifically described herein as other embodiments, the implementation of the following table concepts could also benefit from the generic framework of the invention described herein.

Table parameter and result: The caller side of a function call has the exact table entity of a table parameter, but needs the exact entity of the result table. The situation is opposite at the callee side. This shares the same characteristics with dynamic tables as the linkage between table references and actual subject tables can only be created at run-time.

A table parameter is similar to parameter passing which requires a run-time stack so the producer of the table parameter, i.e., the caller of the function, can put in the actual table object. At the callee side, when a table parameter is referenced, it will always go through the OPEN, FETCH, CLOSE paradigm, but OPEN time will kick off the dynamic linkage of the table parameter which gets the necessary information from the TAOB by looking at the stack.

Abstract table: Abstract tables will ultimately allow all operations on a table to be user definable; that is, the user can define an open, fetch, close, insert, update, delete, and even rollback and commit operations.

Fully-populated table function: Sometimes, it may be desirable to have the full table function result generated during a query evaluation. The implementation of this is straightforward.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hardwired/cabled communication network, cellular communication, radio wave communication, satellite communication, and other stationary or mobile network systems/communication links.

A machine embodying the invention may involve one or more processing systems including, but not limited to, cpu, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

We claim:

1. A method, in a database management system, the method comprising:
 resolving a table reference to an actual table entity unknown at compile-time (a dynamic table) further comprising:
  supporting more than one type of dynamic table including a table function; and
  generating a similar table object for each dynamic table, the similar table objects having different values within the table object to differentiate between the types of dynamic table.

2. The method of claim 1 further comprising executing a run-time routine independently of, except for checking for an existence of the dynamic table, the step of supporting more than one type of dynamic table when a dynamic table is not being referenced.

3. The method of claim 2 wherein the step of checking for the existence of the dynamic table is executed only once when a table being referenced is opened.

4. A method, in a database management system, the method comprising:
 resolving a table reference to an actual table entity unknown at compile-time (a dynamic table), further comprising:
  creating an extended run-time descriptor (extended table object (TAOB)) for the dynamic table; and
  dispatching control, during a run-time routine, to dynamically link the table reference, using the extended table object, with an actual table entity.

5. The method of claim 4 wherein the step of dispatching control occurs during an open run-time routine.

6. The method of claim 4 further comprising marking, by a query compiler, in a parsed representation of the table reference, an identification of the type of dynamic table.

7. The method of claim 4 wherein the step of dispatching control further comprises invoking a dynamic table broker routine; collaborating with a database engine to find the actual table entity to dynamically link the table reference; and updating table attributes of a template TAOB, created by a code generator from the parsed representation, with information about the actual table entity to record the linkage between the table reference and the actual table entity.

8. The method of claim 4 further comprising a step of continuing query processing, after the table reference is resolved by the dynamic linking, as if the dynamic table became a base table or a derived table.

9. The method of claim 4 wherein the type of dynamic table is a transition table.

10. The method of claim 9 further comprising maintaining a run-time stack, by a creator of an actual transition table entity, and pushing the extended table object onto the stack.

11. The method of claim 10 further comprising looking at the top of the run-time stack, by the routine to which control is dispatched, to access the extended table object to find the table identifier of the actual transition table entity.

12. The method of claim 4 wherein the type of dynamic table is a user-defined temporary table.

13. The method of claim 12 wherein the routine to which control is dispatched performs the following steps: looking up the actual table entity in a symbol table; if the actual table entity is found, using the extended table object of the actual table entity to dynamically link the table reference; and if the actual table entity is not found, creating the actual table entity, entering it into the symbol table for subsequent lookups, and using the extended table object of the created table entity to dynamically link the table reference.

14. The method of claim 4 wherein the type of dynamic table is a table parameter or table result.

15. A method, in a database management system, the method comprising:
 resolving a table reference to an actual table entity unknown at compile-time (a dynamic table), further comprising:
  including a type of dynamic table in an extended table object representation capable of receiving run-time parameters;
  dispatching control, from a run-time routine, to a process depending upon the type of dynamic table identified in the extended table object representation;
  including parameters defined at run-time in the extended table object representation including an identity of the actual table entity being referenced; and
  using the extended table object representation, in the process dependent upon the type of dynamic table, for dynamically linking the table reference to the actual table entity.

16. A method, in a database management system, the method comprising:
 resolving a table reference to an actual table entity unknown at compile-time (a dynamic table), further comprising:
  handling, by the query compiler, table functions as a type of a dynamic table;
  marking, by a query parser, a parsed representation of the dynamic table to distinguish between types of dynamic tables;
  including a type of dynamic table marked in the parsed representation into a template run-time descriptor for the corresponding table reference (an extended table object (TAOB)) created by a code generator;
  including parameters defined at run-time in an actual extended TAOB representing the actual table entity including an identity of the actual table entity being referenced;
  dispatching control to a process for dynamically linking the table reference to the actual table entity only known at run-time by using the actual extended TAOB; and
  continuing with query processing, after the dynamic linking resolves the table reference, as if the underlying table were a base or derived table.

17. The method of claim 16 wherein the step of using the actual extended TAOB further comprises copying information, including the identity of the actual table entity, into the template TAOB to dynamically link the table reference to the actual table entity.

18. A method, in a database management system, comprising:
resolving, at run-time, a table reference to an actual table entity unknown at compile-time (a dynamic table), further comprising:
mapping dynamic tables to table functions and identifying, in a parsed representation of the dynamic tables, the table reference as being unresolved;
extending a run-time descriptor for the table being referenced (table object TAOB)) to include parameters defined at run-time including a table identity of the actual table entity; and
using the extended TAOB at run-time to dynamically link the actual table entity with the table reference.

19. The method of claim 18 further comprising allowing a type attribute of the TAQB to identify a type of dynamic table .

20. The method of claim 19 further comprising passing control, if the type attribute indicates a dynamic table, from an open run-time routine to a process, dependent upon the type of dynamic table, for using the extended TAOB to dynamically link the table reference to the actual table entity.

21. A database management system comprising:
means for resolving a table reference to an actual table entity unknown at compile-time (a dynamic table) further comprising;
means for supporting more than one type of dynamic table including a table function; and
a code generator capable of generating a separate executable plan for each type of dynamic table, each executable plan generating a similar table object for each dynamic table, the similar table objects having different values within the table object to differentiate between the types of dynamic table.

22. The database management system of claim 21 further comprising means for executing a run-time routine independently of, except for having a means for checking for an existence of the dynamic table, the means for supporting more than one type of dynamic table when a dynamic table is not being referenced.

23. The database management system of claim 22 wherein the means for checking for the existence of the dynamic table is activated only once when a table being referenced is opened.

24. A database management system comprising:
a code generator capable of creating a temporary extended table object representation (TAOB) for a table, unknown at compile-time, referenced by a table reference (a dynamic table), having a type attribute capable of identifying the type of dynamic table and having fields capable of having parameters definable at run-time including a table identifier for the actual table entity defined at run-time; and
a dispatcher, embedded in a run-time routine, capable of dispatching control to a process for dynamically linking the table reference to the actual table entity.

25. The database management system of claim 24 further comprising a query compiler capable of identifying a type of the dynamic table in a parsed representation of the dynamic table reference.

26. The database management system of claim 24 further comprising a plurality of routines, a routine for each type of dynamic table, for receiving control from the dispatcher and for carrying out the process of dynamically linking the table reference to the actual table entity.

27. A database management system comprising:
means for resolving a table reference to an actual table entity unknown at compile-time (a dynamic table), the means for resolving further comprising:
means for creating an extended run-time descriptor (extended table object (TAOB)) for the dynamic table; and
means for dispatching control, during a run-time routine, to dynamically link the table reference, using the extended table object, with an actual table entity.

28. The database management system of claim 27 wherein the extended table object (TAOB) further comprises a type of dynamic table, and a capability to have parameters definable at run-time including a table identifier for the actual table entity defined at run-time.

29. The database management system of claim 27 further comprising a query compiler having a capability to identify in a parsed representation of the dynamic table corresponding to the table reference, an identification of the type of the dynamic table.

30. The database management system of claim 29 further comprising means for continuing with query processing, after the dynamic linking resolves the table reference, as if the dynamic table became a base or derived table.

31. Computer programming code residing on at least one computer usable medium for use in a database management system, the programming code comprising:
program code means, in a run-time routine, for dispatching control to a corresponding routine for dynamically linking, at run-time, a table reference to an actual table entity wherein the actual table entity was unknown at compile-time (a dynamic table); and
program code means for performing the dynamic linking, by the corresponding routine, by using an extended table object representation of the actual table entity having extended parameters including a type of the dynamic table and including parameters definable at run-time including a table identifier for the actual table entity.

32. The computer programming code of claim 31 wherein the program code means for dispatching control is resident in an OPEN run-time routine.

33. The computer programming code of claim 32, wherein the program code means for dispatching control is capable of identifying a type of the dynamic table in a template table object representation (TAOB).

34. Computer programming code residing on at least one computer usable medium for use in a database management system, the programming code comprising:
program code means for resolving a table reference to an actual table entity unknown at compile-time (a dynamic table), further comprising:
program code means for causing a marking, by a query compiler, in a parsed representation of the table reference, an identification of a type of dynamic table;
program code means for causing a run-time descriptor (extended table object (TAOB)) for the dynamic table to be extended to include the type of dynamic table and to include parameters defined at run-time including a table identifier for the actual table entity defined at run-time; and
program code means for causing a dispatching of control, during a run-time routine, to a routine to dynamically link the table reference, using the extended table object, with an actual table entity.

35. The programming code of claim 34 wherein the program code means for causing a dispatching of control further comprises program code means for invoking a dynamic table broker routine; program code means for causing a collaboration with the database engine to find the actual table entity to dynamically link the table reference; and program code means for causing an update of the table attributes of the TAOB with information about the actual table entity to record the linkage between the table reference and the actual table entity.

36. The programming code of claim 35 wherein the dynamic table broker routine is invoked when a dynamic table is opened for a table operation.

37. The programming code of claim 34 further comprising a plurality of routines, a routine for each type of dynamic table, for receiving control from the dispatcher and for carrying out the process of dynamically linking the table reference to the actual table entity.

38. Computer programming code residing on at least one computer usable medium for use in a database management system, the programming code comprising:

program code means for resolving a table reference to an actual table entity unknown at compile-time (a dynamic table) further comprising;

program code means for supporting more than one type of dynamic table including a table function; and program code means for generating a similar table object for each dynamic table, the similar table objects having different values within the table object to differentiate between the types of dynamic table.

39. The computer programming code product of claim 38 further comprising executing a run-time routine independently of, except for checking for an existence of the dynamic table, the step of supporting more than one type of dynamic table when a dynamic table is not being referenced.

40. The method of claim 39 wherein the step of checking for the existence of the dynamic table is executed only once when a table being referenced is opened.

41. Computer programming code residing on at least one computer usable medium for use in a database management system, the programming code comprising:

means for resolving a table reference to an actual table entity unknown at compile-time (a dynamic table), further comprising:

means for creating an extended run-time descriptor (extended table object (TAOB)) for the dynamic table; and means for dispatching control, during a run-time routine, to dynamically link the table reference, using the extended table object, with an actual table entity.

* * * * *